United States Patent Office 3,466,182
Patented Sept. 9, 1969

3,466,182
POLYMERISATION PROCESS
Clement Henry Bamford, Liverpool, and Frederic James Duncan and Reginald John William Reynolds, Runcorn, England, assignors to Imperial Chemical Industries Limited, London, England, a corporation of Great Britain
No Drawing. Filed Jan. 17, 1966, Ser. No. 520,911
Claims priority, application Great Britain, Feb. 10, 1965, 5,764/65
Int. Cl. C09d 3/47, 11/10; D06p 5/04
U.S. Cl. 117—12                                   35 Claims

ABSTRACT OF THE DISCLOSURE

A process which comprises contacting a receptive substrate with (i) ethylenically unsaturated material which is normally polymerisable by free-radical mechanism, (ii) an organic halogen-containing compound as hereinafter defined and (iii) a transition metal organic compound which with the organic halogen-containing compound provides a combination which is active as a polymerisation initiator for said ethylenically unsaturated material, thereby causing the ethylenically unsaturated material to polymerise in contact with the receptive substrate. Any substrate may be modified by the process if it is of a receptive nature; that is, if it is adsorbent or absorbent or otherwise allows intimate contact by penetration of the components within its structure.

---

This invention relates to a polymerisation process which may be used to modify the properties, and particularly the surface properties, of existing materials.

According to the present invention, we provide a process which comprises contacting a receptive substrate with (i) ethylenically unsaturated material which is normally polymerisable by free-radical mechanism, (ii) an organic halogen-containing compound as hereinafter defined and (iii) a transition metal organic compound which with the organic halogen-containing compound provides a combination which is active as a polymerisation initiator for said ethylenically unsaturated material, thereby causing the ethylenically unsaturated material to polymerise in contact with the receptive substrate. By a transition metal organic compound we mean a compound containing an atom of a metal of Group IV–B, V–B, VI–B, VII–B or VIII of the Periodic Table linked by a predominantly non-ionic bond to an organic residue (including carbonyl).

Any substrate may be modified by the process of our invention if it is of a receptive nature; that is, if it is adsorbent or absorbent or otherwise allows intimate contact by penetration of the components within its structure. The penetration may be on a massive scale, for example by entering fissures or irregularities (e.g. micro-cracks), or on a molecular scale, for example by diffusion into the molecular or macromolecular structure.

The substrate may be organic or inorganic in nature and may be natural or artificial. In particular, there may be mentioned natural materials such as wood, wool, silk, rubber, cotton and animal hairs; synthetic polymers such as regenerated cellulose, cellulose esters; polyesters (e.g. polyethylene terephthalate); polyamides (e.g. nylons); polyolefins (e.g. polymers of ethylene and/or propylene); halogenated polymers (e.g. polymers of vinyl chloride, vinylidene chloride or tetrafluoroethylene); wood, paper and asbestos. It may be in any special form, for example in fibrous form, including individual threads, spun fibres and filaments, loose mats or felts and woven and knitted materials, in film form, in sheet form, as granules, powder or chips or in massive form.

Our process may be used to modify the properties and particularly the surface properties of the materials by choice of suitable ethylenically unsaturated material. Among properties that may be modified may be mentioned particularly antistatic properties, water repellancy, wet strength, water absorption, dirt pick-up, adhesive properties, compatibility with other substances and the receptivity of the substrates to various physical and chemical treatments. Bulk properties, e.g. density, impact strength, hardness, flexibility, elasticity, fire retardance, shrinkage and electrical conductance, may also be modified in many instances.

In particular, our process may be used to modify the dye-receptivity and dye-uptake of various substrates and according to a further embodiment of our invention we provide a modification of the process described above in which the ethylenically unsaturated monomeric material is chosen to be polymerisable to a dye-receptive polymer and the composite material obtained by polymerising the said monomeric material in the presence of the receptive substrate is treated to a dyeing operation with an appropriate dye.

We have found that our process is particularly useful for modifying the dye-receptivity and dye-uptake of materials because the products generally have better dyeing properties than those prepared by similar processes using conventional free-radical initiators in place of the combination of metal organic compound and organic halogen-containing material.

Another advantage of our process is that unlike conventional free-radical initiators such as peroxides, peresters or $\alpha,\alpha'$-azodiisobutyronitrile, many of our initiator combinations are as active or only slightly less active in processes where no precautions have been taken to remove most of the atmospheric oxygen. Thus, using these initiator combinations in our process obviates the need to operate in a closed vessel in vacuo or under an atmosphere of an inert gas. This reduces the capital costs of the process and allows the operator more freedom in siting his apparatus.

Yet another advantage is that the hazards (e.g. explosion dangers) concomitant with the use of conventional free radical initiators are avoided.

With regard to the reactive materials used in our process, the combination of metal organic compound and organic halogen-containing compound must be such as to initiate the polymerisation of the ethylenically unsaturated material chosen for modifying the properties of the substrate. In general, the nature of the organic halogen-containing compound is not critical so long as it contains at least one halogen atom bound to a nitrogen atom or at least one labile halogen atom bound to a carbon atom (i.e. a halogen atom which is activated by the presence on the same carbon atom of an electron withdrawing group or another halogen atom). It may be monomeric or polymeric in nature and is preferably used in liquid form. Thus where it is a solid it is preferred to use it in the form of a solution. We prefer to choose compounds containing chlorine and/or bromine atoms. Compounds containing other halogen atoms are less attractive. For example, in the case of iodine polymerisation inhibition may occur and in the case of fluorine they may be less active. We have found that consistently good results may be obtained if the organic halogen-containing compound contains at least two halogen atoms, each of which is either a chlorine or bromine atom, attached to the same carbon atom. It is further preferred that when there are only two such halogen atoms there should also be an electron-withdrawing group, e.g. $C_6H_5$—, —COOH or —$CONH_2$, attached to the same carbon atom; thus giving a compound of the structure —$CX_2Y$ where Y represents the electron withdrawing group, e.g. dichloroacetic acid. Otherwise it is preferred that the halogenated compound should contain the group —$CX_3$. where each X is chlorine or bromine. Examples of suitable halogenated compounds include simple molecules, e.g. carbon tetrachloride, chloroform, trichlorobromomethane, bromoform, carbon tetrabromide, trichlorofluoromethane, chloral, dichloroacetic acid, trichloroacetic acid, trichloroacetonitrile, benzotrichloride ($C_6H_5 \cdot CCl_3$), tetrachloroethylene or mixtures thereof and polymers, e.g. poly(vinyl trichloracetate). Less highly halogenated compounds, for example methylene chloride, chloroacetamide and poly(vinyl chloroacetate), may also be used although these tend to be less effective. The organic halogen-containing compound may also be one having a halogen, preferably chlorine or bromine, atom linked to a nitrogen atom. Such compounds may be in particular N-halogenated derivatives of compounds containing the group —NH—CO— or

—NH—SO$_2$— these being in general more readily available and more easily handled than N-halogenated amines some of which may be explosive. Examples are N-halogenated derivatives of amides, imides and sulphonamides. N-chlorinated and N-brominated compounds are in general the most readily available and we have found that their activity may be improved by increasing the number of halogen atoms linked to the nitrogen atom and/or by linking the N-halogenated nitrogen atom to an electron-withdrawing group, e.g. $C_6H_5$—, —COOH or —CO—. N-bromoacetamide, N-chloro-N-ethylacetamide, N-bromosuccinimide, N-chloro- and N,N-dichloro-p-toluenesulphonamide and N-chlorobenzamide may be cited as examples of N-halogenated compounds.

Care must be taken when choosing an N-halogenated compound for use in conjunction with metal organic compounds which are carbonyl/phosphine complexes; side reactions may occur to the detriment of the polymerisation if the halogen atom is very active, e.g. as an N-bromosuccinimide.

The suitability of a metal organic compound for our process may be tested simply by mixing about 5 mgs. thereof with 10.2 ml. of methyl methacrylate (or the monomer to be used) and 0.15 ml. of $CCl_4$ or $CBr_4$ in vacuum and heating the mixture at 20–80° C. for 2 hours. If an increase in viscosity occurs which exceeds that obtained in an identical experiment from which the metal organic compound is excluded, the compound is acceptable. The preferred compounds are those giving the larger increases in viscosity.

The metal organic compounds may be chosen in particular from metal carbonyls, by which we mean compounds of transition metals in which at least one carbonyl (CO) group is attached to the metal atom. The metal carbonyls may be used alone or in combination with organic phosphines especially, but also organic arsines or organic stibines. Other metal organic compounds that have been found active are metal complexes with isocyanides, and particularly the complexes of Group VI-B metals with arylisocyanides; triarylphosphite derivatives of Group VIII metals, e.g. tetrakis (triphenyl phosphite) nickel; rhodium halide complexes with trihydrocarbyl-phosphines, e.g. tris(triphenyl phosphine) rhodium iodide, tris(triphenyl phosphine)rhodium bromide and tris(triphenyl phosphine)rhodium chloride, and various metal chelates such as transition metal acetylacetonates and transition metal chelates with other 1,3-dicarbonyl compounds.

Examples of metal carbonyls which may be used are simple metal carbonyls, e.g. of iron, cobalt, nickel, molybdenum, tungsten, chromium, manganese, ruthenium or rhenium; for example molybdenum hexacarbonyl, tungsten hexacarbonyl, tetracobalt dodecacarbonyl, iron pentacarbonyl, iron enneacarbonyl, tri-iron dodecacarbonyl, chromium hexacarbonyl and mixtures thereof. Of these, the molybdenum, manganese and cobalt carbonyls may be mentioned in particular for their activity. Dimanganese decacarbonyl and triruthienium dodecacarbonyl are particularly effective in polymerisation processes in which no precautions are taken to exclude atmospheric oxygen and tungsten hexacarbonyl, chromium hexacarbonyl and molybdenum hexacarbonyl are moderately effective under similar conditions.

Also included within the term metal carbonyl are metal derivatives having one or more other groups, in addition to one or more carbonyl groups, attached to the metal atom; i.e. part carbonyls, for example as in metal carbonyl halides and metal cyclopentadienyl carbonyls. Of such carbonyls may be mentioned in particular those having the structure

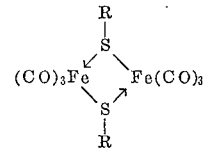

where R is a monovalent hydrocarbon radical. The compound where R is methyl is particularly active in processes even where no precautions have been taken to exclude atmospheric oxygen and that where R is phenyl is also moderately active in such processes.

As stated hereinbefore, the metal carbonyl may be used if desired in combination with an organic phosphine, arsine or stibine. Organic phosphines are generally preferred. The organic phosphine, arsine or stibine may be first reacted with the carbonyl to form a complex therewith which is then used as the metal organic component in our process or else a simple mixture of carbonyl and phosphine, arsine or stibine may be used. With certain combinations of carbonyls and phosphines, simple mixtures are preferred. For example mixtures of molybdenum hexacarbonyl and triphenylphosphine, generally in molar ratios of 1:1 to 1:10 are particularly effective, even in processes where no precautions have been taken to exclude air. The higher ratios are generally preferred.

The organic phosphine is a phosphine in the formula of which one or more of the hydrogen atoms has or have been replaced by monovalent organic radicals. It may contain one or more phosphorus atoms in its molecule, and may be phosphine notionally derived from $PH_3$, $PH_2 \cdot PH_2$ or a hydride having two phosphorus atoms linked by a divalent organic radical, as $PH_2 \cdot (CH_2)_n \cdot PH_2$ where $n$ is an integer. The substituents attached to phosphorus atoms in the organic phosphines generally replace all the hydrogen atoms of the parent phosphine. These substitutents, which may be the same or different, are perferably hydrocarbon radicals of the aliphatic, aromatic and cycloaliphatic series (including aralkyl and alkaryl radicals). Substituted hydrocarbon radicals containing for example a halogen as substituent may be used. The readily available phosphines contain alkyl groups having from 1 to 4 carbon atoms or phenyl groups. As examples of particular organic phosphines there may be mentioned tetramethyldiphosphine, tetraethyldiphosphine, tetraphenyldiphosphine, trimethylphosphine, triethylphosphine, triphenylphosphine, tributylphosphine, 1, 2-bis(dimethylphosphino)ethane, phenyldiethylphosphine and mixtures thereof.

Where the metal carbonyl is interacted with the organic phosphine before use, the complexes thus obtained may be divided conveniently into five common forms, of which two are thought to have a linear structure, two a bridged structure and one a ring structure, as represented respectively by the following Formulae, I, II, III, IV and V, which have no steric significance:

$$(CO)_xM \leftarrow PR_2-Z-PR_2 \rightarrow M(CO)_x \quad (I)$$

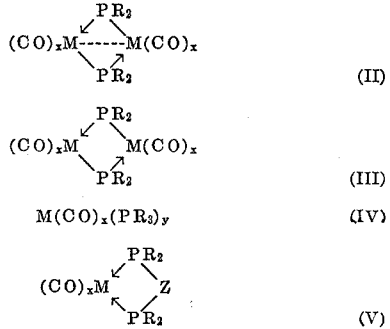

(II)

(III)

$$M(CO)_x(PR_3)_y \quad (IV)$$

(V)

wherein $x$ and $y$ are integers, the groups R are hydrocarbon or substituted hydrocarbon radicals which may be the same or different, Z is a direct link or a divalent organic radical and M is a metal atom. In all these structures, one or more of the carbonyl groups may be replaced by other ligands (e.g. cyclopentadiene or triphenylphosphine) so long as at least one carbonyl group remains attached to each metal atom. Also, in structures II and III, one of the $PR_2$ bridging groups may be replaced, if desired, by another bridging group. In Formula II the metal-to-metal bond may be replaced by halogen atoms linked to the metal atoms, e.g. as in the compound represented as

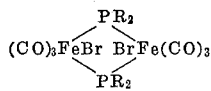

In Formulae IV and V one or more of the carbonyl groups may be replaced by a halogen atom or atoms, so long as at least one carbonyl group is left. Particular examples are represented by the following structures which have no steric significance:

(1) $(CO)_3Ni \leftarrow P\phi_2.P\phi_2 \rightarrow Ni(CO)_3$
(2) $(CO)_5Cr \leftarrow PMe_2.PMe_2 \rightarrow Cr(CO)_5$
(3) $(CO)_5Mo \leftarrow PMe_2.PMe_2 \rightarrow Mo(CO)_5$
(4) $(CO)_5Mo \leftarrow PEt_2.PEt_2 \rightarrow Mo(CO)_5$ (5) 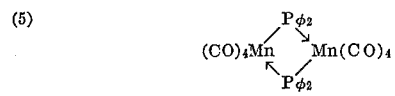

(6) 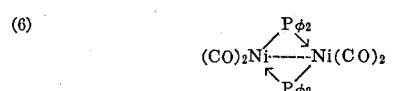

(7) 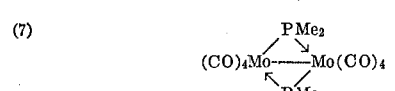

(8) 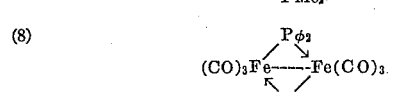

(9) 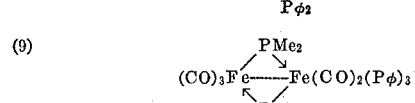

(10) 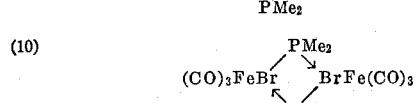

(11) 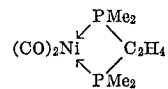

(12) 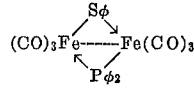

where Me=methyl, Et=ethyl and $\phi$=phenyl. Of these, $(CO)_3Ni \leftarrow P\phi_2.P\phi_2 \rightarrow Ni(CO)_3$ is particularly effective even in processes where no precautions have been taken to exclude atmospheric oxygen.

The simple carbonyl phosphine complexes may be made by heating together the metal carbonyl and the phosphine at elevated temperature and pressure, for example as described by Hayter (Journal of the American Chemical Society, 1964, 86, 823 and Inorganic Chemistry 1964, 3, 711), by Chatt and Thornton (Journal of the Chemical Society, 1964, 1005) and by Chatt and Thompson (Journal of the Chemical Society, 1964, 2713). The requisite conditions depend upon the individual components employed, but suitable temperatures are in the range 25° C. to 250° C., and the heating time is generally in the range 20 to 30 hours. It is usually appropriate to add a hydrocarbon solvent or diluent, for example benzene, and to carry out the heating under the autogenous pressure developed in a sealed vessel, although other pressures, including atmospheric pressure, may be used in some instances. The proportions of carbonyl and phosphine are usually such as to provide one atom of phosphorus for each atom of metal although excess of either component may be used.

Complexes wherein carbonyl or phosphine groups have been replaced by other groups may be formed by suitable reaction of the parent complex. For example, the complex identified as No. 9 may be prepared by dissolving di-u-dimethylphosphino-bis(tricarbonyl-iron) and triphenylphosphine in a hydrocarbon solvent and irradiating the solution with visible or u.v. light for several days. The product may be purified by chromatography and recrystallisation from a suitable solvent. The complex identified as No. 10 may be prepared by dissolving the parent phosphine-carbonyl in a suitable solvent (e.g. carbon tetrachloride or benzene) and adding one equivalent of halogen dissolved in the same solvent. The precipitate may be removed by filtration and purified by recrystallisation.

Owing to the inflammable and toxic nature of the components, it may be desirable, and sometimes essential, to form the complexes with exclusion of air or other oxidising materials.

The resulting complexes may be isolated or recovered from the mixture in which they are formed using conventional techniques, for example crystallisatioin, filtration, etc. or may be used directly without purification.

The organic arsines and stibines that may be used are arsines and stibines in the formulae of which one or more of the hydrogen atoms may be replaced by monovalent organic radicals. The substituents attached to arsenic or antimony atoms in the organic arsines and stibines generally replace all the hydrogen atoms of the parent arsine or stibine. These substituents, which may be the same or different, are preferable hydrocarbon radicals of the aliphatic, aromatic and cycloaliphatic series (including aralkyl and alkaryl radicals). Substituted hydrocarbon radicals containing for example a halogen as substituent may also be used. The readily available compounds contain alkyl groups having from 1 to 4 carbon atoms or phenyl groups. As examples of particular organic arsines and stibines, there may be mentioned $As(CH_3)_3$, $As(C_6H_5CH_2)_3$, $As(C_6H_5)_3$, $As(C_2H_5)_3$, $Sb(C_2H_5)_3$, $Sb(p-CH_3C_6H_5)_3$, $Sb(CH_3)_3$, $Sb(C_6H_5)_3$, $As_2(CH_3)_4$, $As_2(C_6H_5)_4$, $C_6H_5Sb(C_2H_5)_2$ and $Sb_2(CH_3)_4$.

The effectiveness of initiation depends to a considerable degree upon the particular components used and the value of any particular halogen compound has sometimes been found to depend upon the metal organic compound with which it is used and vice versa. Also, a combination which is particularly effective with one monomer for one substrate may be less active for other monomer/substrate combinations. Preferred combinations to suit individual conditions may be established by simple experiment.

The ethylenically unsaturated material suitable for use in our process is any ethylenically unsaturated compound or mixture of ethylenically unsaturated compounds which is polymerisable by a free-radical mechanism. Examples of suitable compounds include vinyl esters, for example vinyl acetate; acrylic monomers, for example acrylic and methacrylic acids and their esters, amides, nitriles and homologues, as in ethyl acrylate, methyl methacrylate, dialkylaminoalkyl methacrylates and acrylonitrile; aralkenes, for example styrene. Other compounds that may be mentioned are the halogenated vinyl monomers, e.g. vinyl chloride and vinylidene chloride and vinyl bases, e.g. vinyl pyridine.

The ethylenically unsaturated material is especially chosen from those compounds in which the double bond is activated by the presence of an electron-attracting group, e.g. a carboxylic ester group, on an ethylenically bound carbon atom.

In general, the process is particularly easy to control where monomers are used which are liquid at normal temperatures and pressures and under the chosen reaction condition; for example methyl methacrylate and styrene.

The process of our invention is carried out by contacting the chosen substrate with the ethylenically unsaturated material, the organic halogen-containing compound and the metal organic compound. The order in which these active compounds are applied to the substrate is immaterial for success so long as all three are present ultimately. Furthermore, each component may be applied individually or two may be applied together. It may be inadvisable to mix all three together for application to the substrate because of the danger of incipient polymerisation of the ethylenically unsaturated material in the mixing vessel. However, this method may be used if the mixture contains a thermally activated initiator combination and is kept below the temperature at which polymerisation first occurs or if the mixture contains a photo-activated initiator combination and is kept in a suitably shaded vessel. In fact, this method is often preferred where it is intended to improve the bulk properties of an absorbent material, e.g. wood.

During our process, some of the ethylenically unsaturated material may tend to form free polymer, i.e. polymer which is not retained by the substrate and which may require removal. A method of operating the process which tends to reduce the formation of this free polymer comprises treating the substrate first with the organic halogen-containing compound together with the metal organic compound and then with the monomer. However, the total polymer yields using this method tend to be less than in other methods.

Another method, which is preferred for its ease of operation is one in which the substrate is treated first with the halogen compound and then with a mixture of the metal organic compound and ethylenically unsaturated material.

Other methods of effecting the process include treating the substrate with the metal organic compound and then with the combination of organic halogen-containing compound and ethylenically unsaturated material and treating the substrate with the organic halogen-containing compound, metal organic compound and ethylenically unsaturated material separately and in any order, but it is generally preferred to add the ethylenically unsaturated material last.

In any method of operating the process, the ratio of free polymer to polymer retained by the substrate may be reduced by treating the substrate with the monomer dissolved in an inert solvent. By an inert solvent we mean a solvent which will not prevent successful polymerisation, e.g. by interference with the initiator components or monomers or both. Examples of suitable solvents include ethers, for example tetrahydrofuran; esters, for example ethyl acetate; nitriles, for example benzonitrile and hydrocarbons, for example benzene, toluene, heptane or hexane. In general, we have found that increasing the amount of solvent decreases the ratio of free polymer to retained polymer and amounts up to about 10 times the volume of monomer may be used if desired. Larger amounts may also be used but the process tends to become uneconomical.

Water may be used as a solvent for water-soluble monomers, if desired.

The amount of polymer produced from the ethylenically unsaturated material using our initiator combinations is a function of the concentrations of the metal organic compound and the organic halogen containing compound. For most organic halogen-containing compounds, initial increases in their concentration improve the rate of production of polymer, the more active compounds giving the greater improvements. However, there is generally a point beyond which further increases yield little or no further improvement in the polymerisation rate and indeed sometimes a small reduction is noticed; as in the case of trichloracetic acid, for example. Furthermore, since most of the halogen-containing compounds are chain transfer agents in polyaddition processes, increasing their concentration may tend to reduce the molecular weights of the polymeric products. In general, the halogen-containing compound is used in concentrations of not more than 0.2 gm. mole/litre of reaction medium, concentrations of from $5 \times 10^{-3}$ to $2 \times 10^{-1}$ gm. mole/litre being preferred.

In the case of the metal organic components of the system, initial increases in concentration also tend to improve the rate of polymerisation and again there is in most cases a point beyond which further increases have little or no further effect. In most cases, there is little advantage to be gained in using more than $1 \times 10^{-2}$ gm. mole/litre of reaction medium and we generally prefer to use concentrations of from $1 \times 10^{-5}$ to $1 \times 10^{-3}$ gm. mole/litre.

Thus, where either component of the initiator system is used in the process as a mixture with the ethylenically unsaturated material, it is generally preferred to use it in the concentrations described above. In many methods of carrying out the process, however, one or more of the components of the initiator system will be used separately from the ethylenically unsaturated material; for example where the substrate is treated first with the organic halogen-containing compound alone and then with the other two ingredients for the process or where it is treated first with the two components of the initiator system and then with the ethylenically unsaurated material. Where the organic halogen-containing compound is used alone, a suitable process comprises soaking the substrate in this compound and the amount of halogen-containing compound retained may be determined by calculating the increase in weight of the substrate due to the soaking step. It may be desirable to improve the uptake by the substrate of the halogen-containing compound by adding to this a solvent or diluent which has the effect of swelling the substrate and is inert in that it will not prevent successful polymerisation. The amount of solvent or diluent that may be used is not critical but very low concentrations of organic halogen-containing compound should be avoided because an insufficient amount of the compound may be retained by the substrate.

The metal organic compound is preferably used in the form of a solution. Conveniently, it may be dissolved in the organic halogen-containing compound or the ethylenically unsaturated material. Alternatively, another solvent may be used so long as it does not prevent successful polymerisation. Preferred concentrations of the metal organic compound are from $1 \times 10^{-5}$ to $1 \times 10^{-3}$ gm. mole/litre of solution.

The ethylenically unsaturated material may be used alone or in an inert solvent, e.g., where it is desired to reduce the amount of free polymer formed as described hereinbefore. Emulsions or dispersions of the metal in water may also be used if desired, as may mixtures or dispersions of the material in suitable inert diluents.

The amount of polymer required to be retained by the substrate will depend upon the choice of substrate, the type of polymer and the nature of the modification desired, and may be established by simple experiment. For example, where it is intended to improve antistatic properties, the amount of polymer required will generally be less than that required where it is intended to modify the bulk properties.

The polymerisation may be activated thermally and/or photochemically, depending upon the particular initiator combination and the reaction conditions employed. In many cases, the reaction occurs readily at room temperature but in general some heat is required. This may be supplied for example by heating the monomer before applying it to the substrate or by passing the treated substrate through a heating zone, e.g., through an oven or under infra-red heaters. Conveniently temperatures from 20 to 100° C. may be used and a temperature of from 40° C. to 80° C. is preferred in most cases. Where photochemical activation is required this may be effected by passing the treated substrate through a suitable radiation zone.

The process proceeds satisfactorily in most cases at atmospheric pressure but higher or lower pressures may be used if desired, the former being particularly suitable where highly volatile monomers are used.

The temperature and time required for the polymerisation are dependent upon several factors, including the individual components employed and the molecular weight required for the product. Suitable conditions may be found by simple experiment but in general the time required will be in the range of from 0.1 to 8 hours, normally 0.1 to 2 hours.

In general, in the free-radical polymerisation of ethylenically unsaturated monomers it is desirable to effect the process in an atmosphere from which oxygen has been substantially completely excluded since at least in more than trace quantities this is normally regarded as an inhibitor of such polymerisation. We have found that by using our initiator combinations, the process may proceed satisfactorily without the need for such precaution although the efficiency may be reduced. With careful choice of catalyst combination, however, and particularly of the metal organic compound, the efficiency may be only slightly affected if at all.

The presence of moisture may also be tolerated and the polymerisation may be effected in aqueous media.

The process may be operated batchwise but is readily adaptable to continuous operation which is especially suitable for the treatment of, for example, webs of film or woven or knitted fabrics. In the case of continuous operation the web may be passed successively through the various treatment zones. The amount of polymer that is formed on and retained by the web may be controlled by adjusting the residence time of the web in the various zones and the concentrations in which the initiator components and ethylenically unsaturated material are used.

In one method of operating the process, the substrate may be passed through a shallow bath containing the organic halogen-containing compound and then the metal organic compound and ethylenically unsaturated material may be applied together, e.g. as a solution or dispersion alone or together with a suitable solvent or diluent. Spray application or weir-application or application using a pair of rollers or similar means may be used. If recycling is contemplated, care should be taken to ensure that the reclaimed ethylenically unsaturated material is free of active initiator because otherwise prepolymerisation may occur in the storage vessel. The substrate may then be passed through a heating or photo-activation zone, if necessary to complete the polymerisation.

By whatever method the ingredients are applied, it will generally be desirable to remove any excess of each before the next one is applied in order to favour polymerisation in the immediate vicinity of the substrate and this may be effected in any suitable manner. For example, volatile ingredients may be removed by flashing and liquid ingredients may be removed where convenient by passing the substrate through absorbent rollers.

On completion of the polymerisation, it may be desirable to remove any free polymer that is formed. This may be effected by washing with a suitable solvent. Thereafter, the treated substrate may be dried and subjected to any further process that is required.

As stated above, our process may be used to modify the surface and/or bulk properties of a substrate and examples of particular applications are as follows.

Paper tissues may be treated with styrene or methyl methacrylate in order to reduce their water absorption.

The flame propagation rate of flammable substrates may be decreased by treatment with a halogenated monomer, particularly vinylidine chloride.

Normally hydrophobic materials may be treated with monomers giving hydrophilic polymers (for example methacrylic acid) to render them oil-repellant.

The adhesion, e.g. to rubber, of materials fabricated from polyamides may be modified by treatment with suitable monomers.

Soft woods may be upgraded by increasing their density by treatment with any suitable monomers.

However, our process is particularly suitable for preparing substrates for printing and dyeing, especially, although not exclusively, where the substrate is fibrous. By use of our process a system may be provided which allows a wider choice of dyes to any particular textile.

The process may be applied to any fibrous substrate and within this term we include unwoven filaments and fibres, both natural and synthetic, and felts and woven and knitted materials prepared therefrom.

Any ethylenically unsaturated material may be used which yields a polymer containing in or pendant from the polymer chain groups which are active to dyestuffs, with the proviso that the polymer must be formed from ethylenically unsaturated material normally polymerisable by a free-radical mechanism. Commonly, the polymer will contain acidic or basic groups, for use in conjunction with basic and acidic dyes respectively. Other polar groups (e.g. ester groups) may be used in conjunction with, for example, disperse dyes. Examples of basic polymers are those derived from bases containing polymerisable ethylenically unsaturated groups, e.g. vinyl pyridines, vinyl piperazine, dialkylaminoalkyl methacrylates and vinyl alkylamines wherein the amine group is separated from the vinyl group by a polymethylene chain. Examples of acidic polymers are those derived from terminally ethylenically unsaturated carboxylic acids, particularly acrylic acid, methacrylic acid and itaconic acid. Esters of these acids, e.g. methyl methacrylate, may also be used.

Copolymers are not excluded but in general it is easier to handle a single monomer than a mixture of monomers. In some cases, however, it may be desirable to use one monomer in solution in another.

Where pretreatments are desired to bring the substrate into a form suitable for dyeing or to ensure proper keying of the polymer during the polymerisation process, these may be effected before the polymerisation step. Examples of such treatments are dewaxing, desizing, scouring, bleaching, cropping, shearing and singeing.

When the substrate has been treated to modify its dyeing properties by use of the process of our invention, it may then be subjected to a dyeing operation using conventional processes and apparatus.

Our invention, may also be used for preparing fibrous webs, particularly textiles, for colour-printing.

According to this embodiment, the areas of the fibrous web to be coloured are first treated with our specified ethylenically unsaturated material and catalyst system so as to obtain dye-receptive polymer formed in situ in contact with the fibrous web. Webs may be prepared for duplex printing by treating both sides. The treated web is then printed in any desired manner, for example using block, stencil or roller printing techniques. In order to avoid running and smudging, particularly in cases where only part of the substrate is to be treated, it may be desirable to apply the active ingredients in the form of pastes, e.g. by emulsifying or dispersing them in suitable thickeners, e.g. concentrated solutions of starch, natural and synthetic gums, cellulose ethers, polyacrylic acid salts and polymeric vinyl alkyl ethers. In such paste forms, the ingredients may be applied from rollers or similar applicators.

In many dyeing operations, a post-treatment process is necessary to convert, oxidise or otherwise treat the substrate to transform the dye to the coloured form, e.g. where vat dyes are used in their leuco form. Where this post-treatment involves heat, it may be possible to apply the ethylenically unsaturated material and then the dye and thereafter heat the treated web thereby causing polymerisation and converting the dye substantially simultaneously.

It will be appreciated that where the substrate after treatment is to be subjected to any of the dyeing and printing processes described, the choice of ethylenically unsaturated material used in the treatment will depend upon the nature of the substrate to be dyed and upon the type of dye used. A further factor affecting choice of ethylenically unsaturated material is the effect of the polymer obtained therefrom on other properties of the substrate, e.g. its handle. By careful choice of ethylenically unsaturated material and by applying it only in the minimum amounts necessary to achieve the desired properties, modification of other properties of the substrate may be kept to a minimum.

By use of our process, a much wider choice of dyes becomes available to the dyer and printer since it is not limited to those dyes traditionally acceptable for the particular fibre type of the substrate. Thus, a wider range of colour shades than before will be available for many textiles.

Our invention is now illustrated but in no way limited by the following examples in which all parts are expressed as parts by weight except where indicated otherwise.

EXAMPLE 1

28.84 parts of polypropylene fibres were soaked in carbon tetrachloride for 30 minutes in a vessel made of Pyrex glass. The wet fibres were then removed from the vessel and placed in a Pyrex tube which was then pumped out to an absolute pressure of $10^{-3}$ mm. of mercury so as to rid the fibres of excess carbon tetrachloride. The pressure was then released and the fibres were transferred to a further Pyrex glass tube to which was charged a reaction mixture comprising:

336 parts of 4-vinyl pyridine
680 parts of distilled water
10.2 parts of sodium dodecylbenzene sulphonate and
1.00 parts of a compound having the formula
$Ni_2(CO)_6P_2(C_6H_5)_4$ and thought to have the structure

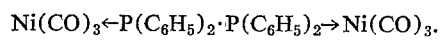

The tube, which was open to the atmosphere, was then placed in a constant temperature water bath at 80° C. and shaken for 2 hours. The reaction mixture was then extracted with boiling ethanol and the treated fibres were dried to constant weight at 45° C. and an absolute pressure of 20 mm. of mercury. The fibres showed a weight increase of 16.25%.

The treated fibres were dyed with azogeranine and both the dye take-up and dye fastness were very good.

By way of comparison, a similar process was effected using $\alpha,\alpha'$-azodiisobutyronitrile as initiator. In this process, 27.69 parts of polypropylene fibres were treated as described above but in this case the reaction mixture included 1.04 parts of $\alpha,\alpha'$-diisobutyronitrile in place of the nickel compound and all the air was removed from the reaction vessel before polymerisation commenced. After extraction with boiling ethanol and drying, the treated fibres showed a weight increase of 7.6%. Dyeing with azogeranine gave uneven weak dyeings which were not fast to washing.

EXAMPLE 2

30.29 parts of polypropylene fibres were treated by a process similar to that described in the first part of Example 1 but in this case instead of being included in the reaction mixture the nickel compound was dissolved in the 1600 parts of carbon tetrachloride in which the fibres were soaked before exposure to the reaction mixture. The treated fibres showed a weight increase of 11.4% and when dyed with azogeranine, both the dye take-up and the dye fastness were good.

By way of comparison, the process was repeated but in this case the fibres were soaked in a solution of 1.5 parts of $\alpha,\alpha'$-azodiisobutyronitrile in 2400 parts of carbon tetrachloride in place of the nickel compound solution.

A weight increase of 7.4% was obtained but dyeing the fibres with azogeranine gave weak and uneven dyeings with poor wash fastness.

As a further comparison, 34.56 parts of polypropylene fibres were soaked in a solution of 1.42 parts of benzoyl peroxide in 1300 parts of toluene. The wet fibres were then dried and contacted with a mixture of 336 parts of vinyl pyridine, 680 parts of water and 10.0 parts of sodium dodecyl benzene sulphonate, as described in Example 1. All the air was removed from the vessel which was then sealed up and shaken for 2 hours at 80° C. After extraction and drying, the treated fibres showed a weight increase of 0.35% and dyeing with azogeranine gave very weak attachment of the dye which was totally removed on washing in hot water.

EXAMPLES 3 TO 9

The process described in the first part of Example 1 was repeated using a variety of reaction conditions and substrates. The reaction variables and the results obtained are set out below in Table 1.

In this and the following tables and examples, the following abbreviations are used.

Monomers

A—Acrylamide
AN—Acrylonitrile
AA—Acrylic acid
DMA—2-dimethylaminoethyl methacrylate
IA—Itaconic acid
MA—Methacrylic acid
MMA—Methyl methacrylate
S—Styrene
VA—Vinyl acetate
VP—4-vinyl pyridine

Organic halogen-containing compounds

C—Chloroform
CTC—Carbon tetrachloride
BTC—Benzotrichloride
NBS—N-Bromosuccinimide
PVTCA—Poly(vinyl trichloracetate)
TCA—Trichloracetic acid
TCE—Tetrachlorethylene ($Cl_2 \cdot C = C \cdot Cl_2$)

TABLE 1

| Example No. | Substrate | Weight (parts) | Halide | Monomer Nature | Monomer Parts | Water (parts) | Nickel compound (parts) | Reaction Time (hr.) | Reaction Temp. (°C.) | Extraction solvent | Wt. increase of substrate, percent |
|---|---|---|---|---|---|---|---|---|---|---|---|
| 3 | Polypropylene fibres | 30.79 | CTC | MA | 347 | 680 | .54 | 2 hours | 80 | $CH_3OH$ | 7.0 |
| 4 | do | 29.64 | BTC | MA | 347 | 680 | 1.00 | do | 80 | $CH_3OH$ | 1.4 |
| 5 | do | 31.01 | CTC | VP | 336 | 680 | 1.06 | 24 hours | 20 | $C_2H_5OH$ | 7.1 |
| 6 | Nylon 66 monofil | 30.08 | CTC | MMA | 468 | 1,000 | 1.50 | 2 hours | 80 | $CHCl_3$ | 3.2 |
| 7 | Terylene cloth | 27.20 | CTC | VP | 336 | 680 | 1.04 | do | 80 | $C_2H_5OH$ | 14.3 |
| 8 | Melinex film | 42.46 | CTC | VP | 336 | 680 | 1.01 | do | 80 | $C_2H_5OH$ | 0.2 |
| 9 | Natural bristle | 25.28 | CTC | MA | 347 | 680 | 1.00 | do | 80 | $CH_3OH$ | 16.0 |

In Examples 3 and 7, 10.4 and 12.0 parts of sodium dodecyl benzene sulphonate were used; in all the others, the amount was 10.00 parts.

The products of Example 3 and 4 were dyed with Magenta RBS and exhibit fair dye take-up and fastness.

The products of Examples 5, 7, 8 and 9 were all dyed with azogeranine. The dye take-up of Example 5 was good and the fastness was fair; the dye take-up and fastness of Example 7 were very good; the dye take-up and fastness of Example 8 were not as good as Example 5 and those of Example 9 were not measured.

The products of Examples 5, 7, 8 and 9 were all dyed Brilliant Blue and exhibited very good dye take-up and fastness.

EXAMPLE 10

The process of the first part of Example 2 was repeated using 30.22 parts of polypropylene fibres. In all other respects the details were the same except that the vinyl pyridine was carefully degassed and the reaction was effected in a sealed vessel from which substantially all air had been removed and under vacuum. The product exhibited a weight increase of 5.6% and very good dye take-up and fastness when tested with azogeranine.

EXAMPLE 11

The process of the first part of Example 2 was repeated using 30.94 parts of polypropylene fibres and 347 parts of methacrylic acid in place of the vinyl pyridine. Methanol was used for the extraction and the weight increase of the fibres was found to be 8.5%. Dyeing with Magenta RBS gave fair dye take-up and fastness.

EXAMPLE 12

The process of Example 11 was repeated using 29.75 parts of nylon 66 monofil, 468 parts of methyl methacrylate in place of the vinyl pyridine and 1000 parts of water. Chloroform was used for the extraction and the weight increase of the fibres was found to be 31.0%. Dyeing with Duranol Brilliant Blue showed very good dye take-up and fastness.

EXAMPLES 13–19

Samples of nylon 66 fabric were boiled for 30 minutes in $2\times10^5$ parts of water containing 300 parts of Lissapol N and 450 parts of anhydrous sodium carbonate. Each sample, which weighed approximately 40 parts, was then soaked for five minutes in carbon tetrachloride and then dried as described in Example 1 except that the vacuum was not released until 30 minutes after pumping commenced. Each dried sample was then contacted with molybdenum hexacarbonyl and an organic solvent in a Pyrex glass vessel and the vessel was evacuated while cooled in liquid nitrogen. A predetermined quantity of degassed methyl methacrylate was then distilled into the vessel under vaccum and the vessel was sealed and heated to 80° C. for 2 hours. The reaction mixture was then extracted with boiling chloroform to remove any free polymer that may have formed and the free polymer was precipitated from the chloroform and dried for weighing. The treated samples were also reweighed after drying.

In each example, the nature of the solvent and/or ratio of solvent to monomer was varied and the reaction parameters and results obtained are indicated in Table 2 below.

TABLE 2

| Example No. | $Mo(CO)_6$ (parts) | MMA (parts) | Solvent Nature | Solvent Volume (percent of monomer) | Wt. of Fabric (parts) Initial | Wt. of Fabric (parts) Final | Percent Wt. inc. | Wt. of homopolymer (parts) |
|---|---|---|---|---|---|---|---|---|
| 13 | 0.55 | 936 | Nil | | 37.32 | 40.90 | 9.6 | >70 |
| 14 | 0.55 | 749 | Dimethyl sulphoxide | 25 | 37.11 | 43.44 | 17.1 | 49.02 |
| 15 | 0.55 | 468 | do | 100 | 37.48 | 42.12 | 12.4 | 33.35 |
| 16 | 0.50 | 561 | Toluene | 66⅔ | 36.47 | 39.86 | 9.3 | 42.20 |
| 17 | 0.54 | 375 | do | 150 | 37.36 | 40.65 | 8.8 | 18.58 |
| 18 | 0.51 | 187 | do | 400 | 36.96 | 39.54 | 7.0 | 4.93 |
| 19 | 0.52 | 93.6 | do | 900 | 38.17 | 41.31 | 8.2 | 7.93 |

The marked reduction in free homopolymer formed (in comparison with polymer held by the stubstrate) on increasing the ratio of solvent to monomer is readily seen.

EXAMPLES 20 and 21

The process described for Examples 13 to 19 was repeated using polypropylene yarn as the substrate. In these experiments, the samples were soaked in carbon tetrachloride for only 1 minute. The solvent was n-propanol and 623.7 parts were used in each experiment. Other experimental details are set out in Table 3.

TABLE 3

| Example No. | Wt. of $Mo(CO)_6$ (parts) | Monomer Nature | Monomer Parts | Wt. of substrate (parts) Initial | Wt. of substrate (parts) Final | Percent wt. inc. |
|---|---|---|---|---|---|---|
| 20 | 0.71 | IA | 200 | 39.55 | 39.85 | 0.8 |
| 21 | 0.41 | A | 157.79 | 20.63 | 24.67 | 19.6 |

EXAMPLES 22–25

In each of these examples a method similar to that of Examples 13 to 19 was used except that each washed sample of nylon 66 fabric was soaked in a solution of 100 parts of molybdenum carbonyl in $16\times10^5$ parts of carbon tetrachloride in place of the carbon tetrachloride alone and then treated with monomer and solvent to which no molybdenum carbonyl had been added. Toluene was used as the solvent in all cases.

Details of each process and the results obtained are found in Table 4.

TABLE 4

| | MMA (parts) | Solvent Vol. (percent of monomer) | Wt. of fabric (parts) Initial | Wt. of fabric (parts) Final | Percent wt. inc. | Wt. fo homo- polymer (parts) |
|---|---|---|---|---|---|---|
| Example No.: | | | | | | |
| 22 | 936 | Nil | 38.49 | 41.80 | 8.6 | 25.85 |
| 23 | 749 | 25 | 37.38 | 40.45 | 8.2 | 15.61 |
| 24 | 468 | 100 | 37.54 | 40.50 | 7.9 | 2.72 |
| 25 | 187 | 400 | 38.27 | 40.79 | 6.6 | 3.71 |

Once again the marked reduction in the amount of free homopolymer on increasing the volume ratio of solvent to monomer may be seen.

EXAMPLES 26–29

The general method used in Example 1 was repeated in several experiments. The subtrate in each case was polypropylene fibre and the reaction mixture consisted of 318 parts of methyl methacrylate, 680 parts of water, 10.0 parts of sodium dodecylbenzene sulphonate and varying proportions of nickel compound. In each example, however, a different organic halogen-containing compound was used in place of carbon tetrachloride.

Other experimental details (where they varied from Example 1) and the results obtained are found in Table 5.

TABLE 5

| | Parts of substrate | Halide | Parts of nickel compound | Final wt.. of substrate (parts) | Percent wt. inc. of substrate |
|---|---|---|---|---|---|
| Example No.: | | | | | |
| 26 | 32.59 | C | 1.00 | 56.90 | 74.6 |
| 27 | 36.19 | PVTCA [1] | 1.05 | Whole mass gelled | |
| 28 | 28.39 | TCA [1] | 1.03 | 38.84 | 36.8 |
| 29 | 31.12 | TCE | 1.10 | 38.76 | 24.6 |

[1] Used as a 1% solution in ethyl acetate.

EXAMPLES 30–40

The general method of Example 1 was repeated in several experiments in which the nature of metal organic compound was varied. The substrate in each case was polypropylene yarn and the organic halogen-containing compound was carbon tetrachloride. The reaction mixture consisted of 318 parts of methyl methacrylate, 680 parts of water, 10 parts of sodium dodecylbenzyl sulphonate and the metal organic compound. As in Example 1, the reaction was effected for 2 hours at 80° C. Other experimental details (where they varied from Example 1) and the results obtained are found in Table 6.

TABLE 6

| | Initial weight of substrate (parts) | Metal organic cpd. Identification | Metal organic cpd. Parts | Final wt. of substrate (parts) | Percent wt. inc. of substrate |
|---|---|---|---|---|---|
| Example No.: | | | | | |
| 30 | 31.62 | 1 | 1.04 | 39.76 | 25.7 |
| 31 | 31.05 | 2 | 1.02 | 32.02 | 3.1 |
| 32 | 33.02 | 3 | 1.04 | 34.48 | 4.4 |
| 33 | 33.99 | 4 | 2.03 | 34.33 | 1.0 |
| 34 | 32.36 | 5 | 1.09 | 32.91 | 1.7 |
| 35 | 30.70 | 6 | 1.01 | 31.38 | 2.2 |
| 36 | 31.64 | 7 | 1.00 | 33.63 | 6.3 |
| 37 | 31.42 | 8 | 0.97 | 31.90 | 1.5 |
| 38 | 32.97 | 9 | 1.00 | 33.08 | 0.3 |
| 39 | 30.05 | 10 | 1.09 | 31.09 | 3.5 |
| 40 [1] | 28.81 | 10 | 1.01 | 30.00 | 4.1 |

[1] The monomer in this example contained about 100 parts per million of hydroquinone.

Key to metal organic compounds:

(1) $Mn_2(CO)_{10}$
(2) $Ru_3(CO)_{12}$
(3) A compound having the formula $Fe_2(CO)_6S_2(CH_3)_2$ and thought to have the structure:

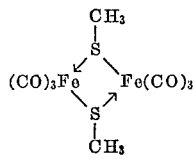

(4) A mixture of 1 mole of $Mo(CO)_6$ to 3 moles of $P(C_6H_5)_3$.
(5) $W(CO)_6$
(6) $Cr(CO)_6$
(7) $Rh[P(C_6H_5)_3]_3Cl$
(8) A compound having the formula $Fe_2(CO)_8P_2(CH_3)_4$ and thought to have the structure:

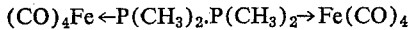

(9) A compound having the formula $$Fe_2(CO)_6P_2(CH_3)_4Br_2$$

and thought to have the structure:

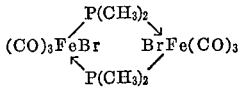

(10) A compound having the formula $$Ni_2(CO)_6P_2(C_6H_5)_4$$

and thought to have the structure:

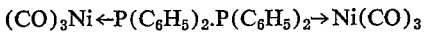

EXAMPLES 41–50

The procedure used in Examples 30 to 40 was repeated in a number of experiments but in each case the methyl methacrylate was carefully degassed before use and the reaction was effected under vacuum in a sealed tube from which substantially all air had been removed. Other experimental details and the results obtained are set out in Table 7. The key to metal-organic compounds is as for Table 6 with the following additions:

(11) Tetrakis (triphenylphosphite) nickel.
(12) Diglyme sodium hexacarbonyl vanadate.

Table 7 on next page.

TABLE 7

| Example No.: | Initial weight of substrate (parts) | Org. metallic c.p.d. Identification | Parts | Final wt. of substrate (parts) | Percent wt. inc. of substrate |
|---|---|---|---|---|---|
| 41 | 30.55 | 1 | 1.02 | 40.87 | 33.8 |
| 42 | 31.79 | 11 | 1.02 | 32.53 | 2.3 |
| 43 | 28.96 | 3 | 1.07 | 29.14 | 0.6 |
| 44 | 32.69 | 4 | 2.07 | 33.06 | 1.1 |
| 45 | 29.33 | 5 | 1.05 | 30.80 | 5.0 |
| 46 | 28.98 | 6 | 1.01 | 30.22 | 4.3 |
| 47 | 29.55 | 7 | 1.03 | 30.00 | 1.5 |
| 48 | 33.06 | 8 | 1.04 | 35.21 | 6.5 |
| 49 | 31.11 | 9 | 1.08 | 31.24 | 0.4 |
| 50 | 35.38 | 12 | 1.05 | 35.41 | 0.1 |

EXAMPLE 51

30.84 parts of polypropylene yarn were soaked for 30 minutes in carbon tetrachloride and then dried as described in Example 1. This yarn was then placed in a Pyrex glass tube together with a reaction mixture consisting of 1.07 parts of $Mn_2(CO)_{10}$ and 936 parts of methyl methacrylate. The tube was left open to the atmosphere and held at 80° C. in a water bath for 2 hours. At the end of this treatment, its reaction mixture was extracted with boiling chloroform and the fibres were dried to constant weight in a vacuum oven. A weight increase of 3% was observed.

EXAMPLE 52

The process of Example 51 was repeated using the same weight of fibre, 1.00 part of a metal organic compound having the formula $Fe_2(CO)_6S_2(CH_3)_2$ and thought to have the structure:

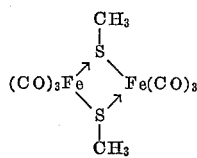

and 936 parts of methyl methacrylate. A weight increase for the fibres of 4.2% was obtained.

EXAMPLE 53

28.89 parts of polypropylene yarn were soaked in carbon tetrachloride for 30 minutes and dried in vacuo as described in Example 1. The yarn was then immersed in a cold solution of 1.00 part of $Mn_2(CO)_{10}$ in 936 parts methyl methacrylate for 5 minutes. On removal from this solution excess fluid was wiped off and the yarn was then placed in a reaction tube which was open to the atmosphere. The tube was held at 25° C. and irradiated for 2 hours with light of wavelength 4358 A. obtained by passing light from a medium pressure mercury arc lamp through Kodak Wratten filters, Numbers 98 and 2E.

After this treatment the yarn was extracted with boiling chloroform and dried to constant weight in a vacuum oven. The weight of the treated polypropylene yarn was found to be 29.49 parts, a weight increase of 2.1%.

EXAMPLES 54–117

In each of the following examples, a process was used in which the chosen substrate was immersed in a vessel containing carbon tetrachloride for a measured time and then removed and placed in Pyrex glass reaction tube which was then pumped out to an absolute pressure of less than $10^{-3}$ mm. of mercury to remove excess carbon tetrachloride. In most examples the vacuum was then released immediately and air was allowed into the tube but in some it was maintained for some time before being released. A predetermined quantity of molybdenum hexacarbonyl was then added to the tube and after further evacuation with the vessel cooled in liquid nitrogen to prevent loss of the metal-organic compound, 936 parts of methyl methacrylate (or an equivalent volume of other monomer where used) were distilled in vacuo into the vessel which was then sealed. The vessel was warmed to allow the monomer to melt, shaken to dissolve the metal organic compound and placed in a water bath for 2 hours (except where otherwise indicated), generally at 80° C. After this treatment, the contents of the vessel were extracted several times in boiling solvent to remove any free homopolymer that may have formed and the residue, consisting of the treated substrate, was dried in a vacuum oven at 40° C. to constant weight.

The reaction details and the weight increase obtained for each example are set out in Table 8.

TABLE 8

| Example No.: | Substrate | Organic halide | Soaking time (minutes) | Drying[1] time (hours) | Monomer | Metal organic compound weight (parts) | Initial weight of substrate, initial (parts) | Percent wt. increase |
|---|---|---|---|---|---|---|---|---|
| 54 | Polypropylene yarn | BTC | ~1 | Y | MMA | 0.55 | [2] 15.89 | 66.0 |
| 55 | do | CTC | 1 | ½ | MA | 0.64 | 52.43 | 1.8 |
| 56 | do | CTC | 1 | ½ | AA | 0.57 | 34.13 | 11.5 |
| 57 | do | CTC | 5 | 1 | DMA | 0.51 | 30.10 | 1.4 |
| 58 | do | CTC | 20 | Y | MMA | [3] 1.10 | [2] 30.28 | 2.7 |
| 59 | do | CTC | 20 | Y | MMA | [4] 1.02 | [2] 31.31 | 2.4 |
| 60 | do | CTC | 1 | Y | MMA | 0.66 | [2] 6.25 | 26.6 |
| 61 | Polypropylene fabric | CTC | ~1 | Y | MMA | .54 | [2] 19.96 | 80.2 |
| 62 [10] | do | NBS[a] | ~1 | Y | MMA | 0.67 | 14.80 | 6.6 |
| 63 | do | BTC | ~1 | Y | MMA | 0.59 | [2] 15.51 | 18.2 |
| 64 | do | CTC | ~1 | Y | S | 0.64 | 7.39 | 0.7 |
| 65 | Polypropylene granular or powder | CTC | ~1 | ½ | MMA | 0.58 | 22.34 | 560.9 |
| 66 | do | CTC | ~1 | 16 | MMA | 0.76 | 42.22 | 303.6 |
| 67 | do | BTC | ~1 | Y | MMA | 0.93 | 21.89 | 361.3 |
| 68 | do | NBS[b] | ~1 | Y | MMA | 0.63 | 41.48 | 16.3 |
| 69 | do | CTC | 5 | ½ | MA | 0.85 | [2] 27.93 | 14.7 |
| 70 [5] | do | CTC | 5 | ½ | AN | 0.74 | [2] 27.36 | 6.0 |
| 71 [5] | do | CTC | ~1 | Y | VA | 0.60 | 51.63 | 2.4 |
| 72 | Nylon 6 fabric | CTC | ~1 | Y | MMA | 0.71 | [2] 15.81 | 16.6 |
| 73 | do | BTC | ~1 | Y | MMA | 0.77 | 13.96 | 23.1 |
| 74 | do | NBS[b] | ~1 | Y | MMA | 0.59 | 11.15 | 14.3 |
| 75 | do | CTC | ~1 | Y | S | 0.56 | 12.85 | 2.6 |
| 76 | Nylon 66 monofil | CTC | ~1 | Y | MMA | 0.52 | [2] 14.61 | 3.0 |
| 77 | do | CTC | ~1 | Y | S | 0.50 | 13.43 | 1.0 |
| 78 [5] | do | CTC | 5 | ½ | VA | 0.63 | [2] 35.93 | 5.9 |
| 79 [5] | do | CTC | 5 | ½ | AN | 0.78 | 37.71 | 8.6 |
| 80 [5] | do | CTC | 5 | ½ | MA | 0.82 | 35.73 | 2.3 |
| 81 [5] | do | BTC | 5 | ¾ | VA | 0.60 | 18.39 | 11.7 |
| 82 [5] | do | BTC | 5 | ¾ | AN | 0.68 | [2] 21.02 | 8.3 |
| 83 | Nylon 6.10 monofil | BTC | ~1 | Y | MMA | 0.66 | 14.79 | 9.2 |
| 84 [5] | do | BTC | 5 | ¾ | VA | 0.57 | [2] 34.80 | 8.0 |
| 85 [5] | do | BTC | 5 | 7/12 | AN | 0.70 | [2] 31.54 | 9.6 |
| 86 | do | BTC | 5 | Y | MA | 0.73 | [2] 44.70 | 7.5 |
| 87 [5] | do | CTC | 5 | ¾ | AN | 0.75 | 40.05 | 7.6 |
| 88 | do | CTC | 5 | ¾ | MA | 0.65 | [2] 25.24 | 9.4 |
| 89 [5] | do | CTC | 5 | ½ | VA | 0.72 | 28.50 | 9.3 |

See footnotes at end of table.

TABLE 8—Continued

| Example No.: | Substrate | Organic halide | Soaking time (minutes) | Drying time (hours) [1] | Monomer | Metal organic compound weight (parts) | Initial weight of substrate, initial (parts) | Percent wt. increase |
|---|---|---|---|---|---|---|---|---|
| 90 | Paper (unsized) | CTC | ~1 | Y | MMA | 0.53 | [2] 6.41 | 1.1 |
| 91 | do | CTC | 5 | ½ | MA | 0.70 | 8.16 | 13.7 |
| 92 [5] | do | CTC | 5 | ½ | AN | 0.67 | 10.43 | 4.2 |
| 93 | Paper (sized) | CTC | ~1 | Y | S | 1.07 | 11.51 | 11.2 |
| 94 | do | NBS [b] | ~1 | Y | MMA | 0.64 | 11.94 | 3.6 |
| 95 | do | NBS [a] | ~1 | Y | MMA | 0.51 | 13.16 | 1.7 |
| 96 | do | CTC | ~1 | Y | MMA | 0.63 | 8.11 | 3.2 |
| 97 [5] | do | CTC | ~5 | ½ | MA | 0.58 | 13.54 | 15.2 |
| 98 [5] | do | CTC | 5 | ½ | AN | 0.60 | 15.09 | 4.1 |
| 99 | Very small teak chips | CTC | ~1 | Y | MMA | 0.85 | [2] 14.05 | 1.1 |
| 100 [5] | Asbestos (sheet) | CTC | 5 | ½ | AN | 0.54 | 33.47 | 1.2 |
| 101 | do | CTC | 5 | ½ | MMA | 0.67 | 35.55 | 1.7 |
| 102 | do | CTC | 5 | ½ | S | 0.51 | 34.29 | 1.0 |
| 103 [5] | do | CTC | 5 | ½ | VA | 0.55 | 37.77 | 0.7 |
| 104 | Polytetrafluoroethylene thread | CTC | 30 | Y | MMA | 0.92 | [2] 4.97 | 5.2 |
| 105 | Bleached cotton fabric | CTC | ~1 | Y | MMA | 0.52 | [2] 20.13 | 2.9 |
| 106 [5] | do | CTC | 5 | ½ | AN | 0.87 | 22.17 | 2.0 |
| 107 | Kieselguhr ("Embacel") | CTC | ~1 | Y | MMA | 0.81 | 15.37 | 1.6 |
| 108 | do | CTC | 5 | ½ | MA | 0.56 | 12.43 | 3.6 |
| 109 | Bentonite | CTC | ~1 | Y | MMA | 0.57 | 23.98 | 7.1 |
| 110 [5] | do | CTC | 5 | ½ | AN | 0.69 | 38.59 | 41.2 |
| 111 | Polyethylene terephthalate (fabric) | CTC | 5 | ¾ | MMA | 0.84 | 12.32 | 3.6 |
| 112 | do | CTC | 5 | ½ | MA | 0.76 | 11.52 | 0.5 |
| 113 [8] | Wool | CTC | 5 | 2 | S [7] | 2.25 | 183.05 | 5.3 |
| 114 [9] | Silk | CTC | 5 | 1½ | S [7] | 2.23 | [2] 142.24 | 33.2 |
| 115 | Polypropylene granules | CTC | ~1 | Y | MMA | 0.80 | [2] 25.41 | 234 |
| 116 | Bentonite | CTC | ~1 | Y | MMA | 0.77 | 22.84 | 1.7 |
| 117 | Asbestos sheet | CTC | 5 | ½ | AN | 0.54 | 33.47 | 1.3 |

[1] The letter "Y" in the column recording drying time identifies the case where the time was that required just to pump out the vessel to a vacuum of less than $10^{-3}$ mm. of mercury, vacuum then being released. In cases where an actual time is given, the vessel was maintained for some time after this vacuum had been achieved and the times indicated were calculated from the point at which pumping first commenced.

[2] The initial weight of the substrate is usually recorded as that measured after the substrate has been soaked in the organic halogen-containing compound and dried. In cases where the figure (2) is given after the recorded weight, however, it was measured before the substrate was soaked in the organic halogen-containing compound.

[3] Triruthenium dodecacarbonyl was used in place of molybdenum hexacarbonyl.

[4] $Fe_2(CO)_6P_2(CH_3)_4Br_2$ was used in place of molybdenum hexacarbonyl.

[5] A reaction temperature of 70° C. was used.

[6] A reaction time of 2 hours 40 minutes was used.

[7] 4,545 parts of styrene were used.

[8] A reaction time of 4 hours was used.

[9] A reaction time of 8 hours was used.

[10] A reaction time of 90 minutes was used.

[a] The substrate was soaked in a 1% solution of NBS in benzene, lifted out, rinsed in benzene and dried.

[b] As for [a] but the rinsing step was omitted.

EXAMPLE 118

287 parts of polyethylene terephthalate fabric were immersed in carbon tetrachloride for 1½ hours and then dried in a vacuum oven for ½ hour, at 25° C. The fabric was then mixed with 3.8 parts of molybdenum hexacarbonyl and 9400 parts of methyl methacrylate monomer, and the mixture was maintained at 80° C. for 1 hour. The mixture was then poured into methanol, and the treated fabric was recovered by filtration, dried, and washed 6 times with chloroform. The fabric was then soaked for 12 hours in chloroform and collected and washed again, soaked again for 2 days longer in chloroform and finally recovered and washed 3 times more with chloroform. The final weight of treated fabric was 311.6 parts.

EXAMPLE 119

The procedure of Example 118 was repeated using 330 parts of a polypeptide fabric (poly-gamma-methyl-L-glutamate) and 4.1 parts of molybdenum hexacarbonyl. The final weight of treated product, when all stages of the soaking and washing with chloroform were complete, was 389.9 parts.

EXAMPLE 120

70.86 parts of wood (red deal) which had been dried in vacuo for 1 hour were degassed for a further hour. A solution of 1.04 parts of molybdenum hexacarbonyl and 80 parts of carbon tetrachloride in 936 parts of methyl methacrylate was then degassed and added in vacuo to the wood. After heating for 2 hours at 80° C., the wood was removed from the solution, extracted in boiling chloroform and dried in a vacuum oven at 40° C. The weight of treated wood was 90.5 parts, a weight increase of 27.8% on the starting material.

EXAMPLE 121

A sample of beech wood, size 1" x 2" x ⅛" and weighing 1.8657 gm., was dried in vacuo for 1 hour, placed in a glass reaction tube together with 0.0106 gm. of $Mo(CO)_6$ and degassed for a further hour by pumping the tube out to less than $10^{-3}$ mm. of mercury pressure while immersed in liquid nitrogen. 0.5 ml. of carbon tetrachloride and 10 mls. of methyl methacrylate were degassed and distilled in vacuo into the tube which was then sealed, warmed to melt the components, shaken to dissolve the $Mo(CO)_6$, and placed in a water bath at 80° C. for 2 hours. The reaction mixture was then extracted with boiling chloroform several times to remove free homopolymer and the wood was dried in a vacuum oven at 40° C. The weight of the treated beech was 2.0792 gms., a weight increase of 11.4%.

EXAMPLE 122

A thin sheet of dry balsa wood of size 1" x 1" x 1/16" and weighing 0.1535 gm. was immersed in a solution of $Mo(CO)_6$ in carbon tetrachloride (concentration 1 gm./litre) for 5 minutes, and placed in a glass reaction tube which was then pumped out to an absolute pressure of less than $10^{-3}$ mm. of mercury latterly immersed in liquid nitrogen. 10 mls. of previously degassed methyl methacrylate were distilled under vacuum into the reaction tube which was then sealed and placed in a constant temperature water bath at 80° C. for 2 hours. The balsa wood was then removed from the tube, extracted several times with boiling chloroform, and dried in a vacuum oven at 40° C. to constant weight. The final weight was 0.1602 gm., a weight increase of 4.4%.

EXAMPLE 123

A thin sheet of dry balsa wood of size 2" x ½" x ⅛" and weighing 0.3774 gm. was impregnated in a pressure vessel with a solution of 0.0148 gm. of a compound having the formula $Ni_2(CO)_6P_2(C_6H_5)_4$ and thought to have the structure:

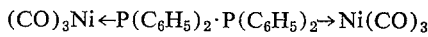

and 1.5 mls. of carbon tetrachloride in 150 mls. of methyl methacrylate under a pressure of 85 atmospheres of nitrogen at 25° C. for 2 hours. The wood was then removed from the solution in the pressure vessel, wrapped in aluminium foil, and immersed in a water bath at 80° C.

for 2 hours. The sample was then unwrapped, extracted with boiling chloroform, and dried in vacuo at 40° C. The weight of the treated balsa was 0.4321 gm., a weight increase of 14.5%.

EXAMPLE 124

The process of Example 123 was repeated with a 2" x ½" x ⅛" sheet of balsa weighing 0.3775 gm., but the impregnation was effected for 4 hours. After reaction, extraction and drying, the weight of the treated sample of balsa was 0.4837 gm., a weight increase of 28.1%.

EXAMPLE 125

A 1" x 1" x 1/16" sheet of dry pine weighing 0.7403 gm. was soaked for 15 minutes in a 1 gm./litre solution in carbon tetrachloride of the metal organic compound of Example 123, and dried in a blast of air. The sample was then immersed in methyl methacrylate in a pressure vessel at 25° C. for 3 hours under a pressure of 100 atmospheres of nitrogen gas. It was then removed, wrapped in aluminium foil and placed in a water bath at 80° C. for 8 hours.

After drying in vacuo at 40° C., the weight of the treated pine was found to be 1.2590 gms., a weight increase of 70.1%.

EXAMPLE 126

A 1" x 1" x 1/16" sheet of dry pine weighing 0.3912 gm. was placed in a glass tube which was pumped out to a pressure of less than $10^{-3}$ mm. of mercury for 30 minutes. A 2 gm./litre solution in toluene of the metal organic compound in Example 123 was run into the tube which was then opened to the atmosphere and left for 30 minutes. The sample was then removed, wiped with paper tissue and placed in an empty reaction tube which was pumped out to a pressure of less than $10^{-3}$ mm. of mercury for 30 minutes. A solution of 5 mls. of carbon tetrachloride and 95 mls. of acrylonitrile was then run into the tube and again the tube was opened to the atmosphere and left for 30 minutes. The liquid was then run off and the tube was sealed and heated in a constant temperature water bath at 50° C. for 17 hours after which the wood was removed and dried. The weight of the treated sample was found to be 0.3990 gm., a weight increase of 2.0%.

EXAMPLE 127

121 parts of terylene wool were soaked in carbon tetrachloride overnight, removed and dried in a vacuum oven at room temperature for 2 hours. The wool was then placed in a vessel with 15 parts of chromium hexa(m-chlorophenylisocyanide) and 9,360 parts of degassed methyl methacrylate and the vessel was evacuated to remove substantially all atmospheric oxygen, sealed and heated to 80° C. for 1 hour. At the end of this period, the vessel was opened, the wool removed, refluxed with chloroform to remove any free polymer, washed and dried to constant weight. A weight increase of 5.1% was recorded.

EXAMPLE 128

Following the process of Example 127, 110.3 parts of nylon 66 fibre were treated with 9,360 parts of methyl methacrylate using 16.2 parts of chromium hexa(m-chlorophenylisocyanide) as the metal organic compound. A 4.9% increase in weight was recorded.

EXAMPLE 129

Following the process of Example 127, 154 parts of polypropylene powder were treated with 9,360 parts of methyl methacrylate using 14.0 parts of chromium hexa(m-chlorophenyl isocyanide) as the metal organic compound. A 1.4% increase in weight was recorded.

EXAMPLE 130

Following the process of Example 127, 93.4 parts of terylene wool were treated with 9,360 parts of methyl methacrylate using 10.2 parts of chromium hexa(p-tolylisocyanide) as the metal organic compound. A weight increased of 5.1% was recorded.

Similar results may be obtained using the hexa(phenylisocyanide) derivatives of zero-valent molybdenum and tungsten as the metal organic compounds.

EXAMPLE 131

A 1" x 1" x 1/16" sheet of dry pine, weighing 0.4348 gm., was placed in a glass tube and evacuated for 30 minutes using an oil pump. Into the tube was then run enough of a 0.14 gm./litre solution of the metal organic compound of Example 123 in CCl₄ to cover the wood and the tube was opened, the pressure rising to atmospheric. After soaking for 1 hour, the wood was removed, dried in an air blast, placed in a reaction tube and evacuated for 3 minutes using an oil pump. Enough vinylidene chloride monomer to cover the wood was deaerated by bubbling nitrogen gas through, and then run into the tube, which was opened to allow the pressure to rise to that of the atmosphere by admitting air. The tube was then closed and left at room temperature overnight (approximately 16 hours). The wood was then removed and dried in a vacuum oven at 40° C. for 23 hours and the weight of the treated wood was found to be 0.4389 gm., a weight increase of 0.9%.

EXAMPLE 132

A 2½" x ½" x ⅛" sheet of dry pine weighing 1.1057 gms. was soaked in a solution in CCl₄ of the metal organic compound of Example 123 and dried in an air blast as in Example 131. It was then placed in a Carius tube and evacuated down to an absolute pressure of about 1 mm. of mercury. A previously degassed mixture of 0.5 ml. of CCl₄ and 30 ml. of vinylidene chloride was then distilled into the Carius tube which was sealed and maintained at 50° C. for 16 hours. The wood was then removed from the tube and dried for 23 hours. The weight of the treated wood was found to be 1.4274 gms., a weight increase of 29.1%.

EXAMPLE 133

The process of Example 132 was repeated with a wood sample of similar dimensions but weighing 1.1177 gms. A weight increase of 24.4% was obtained.

The polypropylene based articles treated with methyl methacrylate, styrene or vinyl acetate as described in the examples show improved affinity for disperse dyes while those treated with methacrylic acid, acrylic acid or itaconic acid are more readily coloured with basic dyes. Treatment with vinyl pyridine improves the affinity of polypropylene articles for acid dyes and acrylamide-modified polypropylene articles are more hydrophilic.

The polyamide samples treated by our process generally have improved adhesion properties, e.g. to rubber, and in addition their affinity for acid, basic or disperse dyes is modified, depending upon nature of the ethylenically unsaturated material used for the treatment. The asbestos sheets treated according to the examples also have modified adhesive properties and similar results are obtained with the treated polytetrafluoroethylene threads and kieselguhr. Polyester articles treated by our process as shown in the examples generally exhibited modified dyeing properties in much the same way as the treated polyamide articles; for example, methacrylate-modified terylene cloth has improved disperse dye-uptake and receptivity while that modified with vinyl pyridine is able to be dyed with acid dyes.

Both the sized and unsized paper samples treated with styrene, methyl methacrylate or acrylonitrile show decreased water adsorption in addition to modification of their strength and all the wood samples have increased bulk density although other properties are modified differently according to the nature of the wood and the choice of ethylenically unsaturated material for use in the treatment. The bristles treated according to the example show improved oil repellancy.

We claim:

1. A process which comprises contacting a penetrable receptive substrate with (i) a vinyl monomer which is normally polymerizable by free-radical mechanism, (ii) an organic halogen-containing compound selected from the group consisting of organic compounds containing a halogen atom attached to a nitrogen atom and organic compounds containing a labile halogen atom attached to a carbon atom and (iii) a transition metal coordination complex containing at least one ligand selected from the group consisting of carbonyl, phosphine, phosphite and isocyanide thereby causing the ethylenically unsaturated material to polymerize in contact with the receptive substrate.

2. A process according to claim 1 in which the organic halogen-containing compound contains at least two halogen atoms selected from the group consisting of chlorine and bromine, attached to the same carbon atom.

3. A process according to claim 2 in which the organic halogen-containing compound contains a structure selected from the group consisting of $-CX_2Y$ and $-CX_3$ where each X is selected from the group consisting of chlorine and bromine and Y is an electron-withdrawing group.

4. A process according to claim 1 in which the organic halogen-containing compound is selected from the group consisting of carbon tetrachloride, chloroform, trichloroacetic acid, and benzotrichloride.

5. A process according to claim 1 in which the organic halogen-containing compound is poly(vinyl trichloroacetate).

6. A process according to claim 1 in which the organic halogen-containing compound is N-bromosuccinimide.

7. A process according to claim 1 in which the transition metal coordination complex is selected from the group consisting of dimanganese decacarbonyl and triruthenium dodecacarbonyl.

8. A process according to claim 1 in which the transition metal coordination complex is a hexacarbonyl of a Group VI–B metal.

9. A process according to claim 1 in which the transition metal coordination complex has the formula $Fe_2(CO)_6S_2(CH_3)_2$.

10. A process according to claim 1 in which the transition metal coordination complex is formed from a metal carbonyl in admixture with an organic phosphine.

11. A process according to claim 10 in which the transition metal coordination complex is a compound having the formula $Ni_2(CO)_6P_2(C_6H_5)_4$.

12. A process according to claim 10 in which the transition metal coordination complex is a simple mixture of molybdenum hexacarbonyl with triphenylphosphine in the molar ratio of 1:1 to 1:10.

13. A process according to claim 1 in which the transition metal coordination complex is a complex of chromium with a compound selected from the group consisting of m-chlorophenyl-isocyanide and p-tolylisocyanide.

14. A process according to claim 1 in which the transition metal coordination complex is tetrakis(triphenylphosphite)nickel.

15. A process according to claim 1 in which the transition metal coordination complex is a tris(triphenyl)rhodium chloride.

16. A process according to claim 1 in which the organic-halogen containing compound is used in an amount of from $5\times10^{-3}$ to $2\times10^{-1}$ gm. mole/litre of the reaction medium.

17. A process according to claim 1 in which the transition metal coordination complex is used in an amount of from $1\times10^{-5}$ to $1\times10^{-3}$ gm. mole/litre of the reaction medium.

18. A process according to claim 1 in which the substrate is contacted first with the organic halogen-containing compound in combination with the transition metal coordination complex and thereafter with the vinyl monomer.

19. A process according to claim 1 in which the substrate is contacted first with the organic halogen-containing compound and thereafter with the vinyl monomer in combination with the transition metal coordination complex.

20. A process according to claim 1 in which the vinyl monomer is used as a solution in an inert solvent.

21. A process according to claim 1 in which the organic halogen-containing compound is used together with an inert diluent.

22. A process according to claim 1 which is operated at a temperature of from 40 to 80° C.

23. A process according to claim 1 which is activated photochemically.

24. A process according to claim 1 in which the process is effected continuously by passing the substrate through a series of stations where it is contacted with the reagents individually or in combination.

25. A process according to claim 1 in which the vinyl monomer is chosen to be polymerizable to a dye-receptive vinyl polymer.

26. A process according to claim 25 in which the substrate is fibrous.

27. A process according to claim 25 in which the composite material obtained by polymerizing the vinyl monomer in the presence of the receptive substrate is treated to a dyeing operation with a dye selected from the group consisting of acid, basic and disperse dyes.

28. A process according to claim 25 in which the composite material obtained by polymerizing the vinyl monomer in the presence of the receptive substrate is treated to a color-printing operation.

29. A process according to claim 1 in which the water absorption of paper tissue is reduced by treatment with vinyl monomer selected from the group consisting of styrene and methyl methacrylate.

30. A process according to claim 1 in which the flammability of a flammable substrate is reduced by treatment with a halogenated vinyl monomer.

31. A process according to claim 30 in which the halogenated monomer is vinylidene chloride.

32. A composite material prepared by the process of claim 1.

33. A process which comprises treating the composite material obtained by the process of claim 25 to a dyeing operation.

34. A dyed article made by the process of claim 33.

35. A colour-printed article made by the process of claim 28.

References Cited

UNITED STATES PATENTS

| | | | |
|---|---|---|---|
| 2,732,317 | 1/1956 | Kirby. | |
| 2,969,408 | 1/1961 | Nowlin et al. | 252—431 X |
| 3,019,215 | 1/1962 | Kroeper et al. | |

RALPH S. KENDALL, Primary Examiner

CHARLES R. WILSON, Assistant Examiner

U.S. Cl. X.R.

8—18; 117—15, 161